United States Patent
Mauritz et al.

(10) Patent No.: US 6,658,025 B2
(45) Date of Patent: Dec. 2, 2003

(54) SYNCHRONIZATION IN PACKET-SWITCHED TELECOMMUNICATIONS SYSTEM

(75) Inventors: Oskar Mauritz, Johanneshov (SE); Jaap Van De Beek, Sundbyberg (SE)

(73) Assignee: Nokia Networks Oy, Espoo (FI)

( * ) Notice: Subject to any disclaimer, the term of this patent is extended or adjusted under 35 U.S.C. 154(b) by 134 days.

(21) Appl. No.: 09/940,857

(22) Filed: Aug. 29, 2001

(65) Prior Publication Data

US 2002/0141452 A1 Oct. 3, 2002

Related U.S. Application Data

(63) Continuation of application No. PCT/FI00/01159, filed on Dec. 28, 2000.

(30) Foreign Application Priority Data

Dec. 30, 1999 (FI) ............................................. 19992828

(51) Int. Cl.$^7$ .................................................. H04J 3/06
(52) U.S. Cl. ...................... 370/507; 370/516; 375/362; 375/371
(58) Field of Search ................................. 370/503, 507, 370/509, 512, 516–519, 252, 395.62; 375/362, 365, 366, 371

(56) References Cited

U.S. PATENT DOCUMENTS

| | | |
|---|---|---|
| 5,260,978 A | 11/1993 | Fleischer et al. |
| 5,608,731 A * | 3/1997 | Upp et al. ............. 370/395.62 |
| 5,694,397 A | 12/1997 | Burton |
| 5,751,721 A | 5/1998 | Bloks |
| 5,822,383 A | 10/1998 | Muntz et al. |
| 5,982,828 A * | 11/1999 | Fujimori et al. ............ 375/356 |
| 6,148,049 A * | 11/2000 | Hein ........................... 375/354 |
| 6,167,048 A | 12/2000 | Law et al. |

FOREIGN PATENT DOCUMENTS

| | | |
|---|---|---|
| EP | 800 295 | 10/1997 |
| EP | 876 017 | 11/1998 |
| WO | WO 99/38285 | 7/1999 |
| WO | WO 00/48421 | 8/2000 |

OTHER PUBLICATIONS

Lau et al., "Synchronous Techniques for Timing Recovery in BISDN," IEEE Transactions on Communications, vol. 43, No. 2,3,4, Feb. 1995, see section IV B, V.

* cited by examiner

Primary Examiner—Ricky Ngo
Assistant Examiner—Christopher M Swickhamer
(74) Attorney, Agent, or Firm—Pillsbury Winthrop LLP

(57) ABSTRACT

A method and equipment for providing frequency synchronization in a telecommunications system, wherein time stamps providing timing information are transferred over a packet-switched network from a transmitter network element to a receiver network element having a receiver oscillator. The expected times for reception of time stamps are estimated (i), deviations from the estimated expected time for the time stamps are calculated (ii) and at least one time stamp deviating most from the estimated expected time is removed (iii). The steps (i)–(iii) are repeated until a pre-determined number of time stamps is removed. Frequency of the receiver oscillator is then estimated using the remaining time stamps and the frequency generation of the receiver oscillator is adjusted based on the estimated frequency.

14 Claims, 3 Drawing Sheets

SYNCHRONIZATION IN PACKET-SWITCHED TELECOMMUNICATIONS SYSTEM

This application is a Continuation of International Application PCT/FI00/01159 filed on Dec. 28, 2000, which designated the U.S. and was published under PCT Article 21(2) in English.

BACKGROUND OF THE INVENTION

The present invention relates to a method and equipment for synchronizing network elements over a packet-switched network.

A telecommunications network is a network where network elements, especially switches and base stations, need to work coherently. Oscillators in these devices are generally not accurate enough over longer time intervals and need to be adjusted in order to keep them synchronized. Timing errors are due to variations in network delay and latencies in computer hard-ware and software as well as clock oscillator instability.

Time stamps may be used to deliver timing information for synchronization between network elements. Time stamps typically describe the time they were created according to a clock of a transmitter network ele-ment sending the time stamps. A receiving network element then tries to achieve the same timing as the transmitter by adjusting its local clock based on the received time stamps. In a packet-switched network the transmission delays may vary very much and the time stamps may be delayed with a large variation in the delay.

Networks based on the IP protocol are not typically clocked since they operate asynchronously, and transmission times are highly variable and unpredictable. Network Time Protocol (NTP) is a protocol used to syn-chronize clocks over a packet-switched network, especially over IP networks.

The scope of NTP is to synchronize the absolute time values and the frequencies of the clocks involved. NTP is widely used in the Internet to synchronize computer clocks to national standard time.

One problem with the prior art solutions is that they do not work very well with wide variations in delay typical of packet-switched net-works. In many cases it is enough to adjust the frequency of a system clock, which makes NTP unnecessarily complex for this purpose.

BRIEF DESCRIPTION OF THE INVENTION

The object of the invention is to enhance frequency syn-chronization in networks with variable delays. The object of the invention is achieved with a method, an apparatus and a telecommunications system which are characterized by what is disclosed in the independent claims. The preferred embodiments of the invention are set forth in the dependent claims.

The invention is based on adjusting frequency generation based on estimating the frequency of a receiver oscillator to be synchronized using only part of the received time stamps. Time stamps are transferred from a transmitter network element (meaning any network element providing reference timing information) to a receiver network element (meaning any network element obtaining timing information to achieve frequency synchronization). The expected reception times of time stamps are estimated, preferably taking all time stamps in pre-determined window into account. The deviations from the estimated expected times are calculated for time stamps and at least one time stamp deviating most from the estimated expected time is removed. The estimations, deviation calculations and time stamp removals are repeated taking remaining time stamps into account as many times as necessary until a pre-determined part of the time stamps has been removed. The frequency of the receiver oscillator is then estimated using the remaining time stamps after the pre-determined part of the time stamps is removed. The frequency generation of the receiver oscillator is then adjusted based on the estimated frequency. According to a preferred embodiment of the invention, the expected times for reception of the time stamps and the oscillator frequency are estimated by least-squares method. Also, according to an embodiment of the invention, it is possible to remove the pre-determined number of time stamps and estimate the frequency without using iteration.

One advantage of the invention is that synchronization can be more reliably performed as the frequency of the receiver oscillator can be estimated more accurately especially in networks with greatly variable delays.

A further advantage is that the frequency synchronization according to the invention is easier to implement than the techniques providing time and frequency synchronization. Also, no specific request for transmission of time stamps is needed.

BRIEF DESCRIPTION OF THE DRAWINGS

In the following, the invention will be described in greater detail by means of preferred embodiments and with reference to the accompanying drawings, in which.

DETAILED DESCRIPTION OF THE INVENTION

The invention can be used in any telecommunications system, where frequency synchronization of network elements is needed over a packet-switched network. In a preferred embodiment of the invention the network is a packet-switched local area network (LAN) yet without limiting the invention to that kind of particular network.

Figure 1:
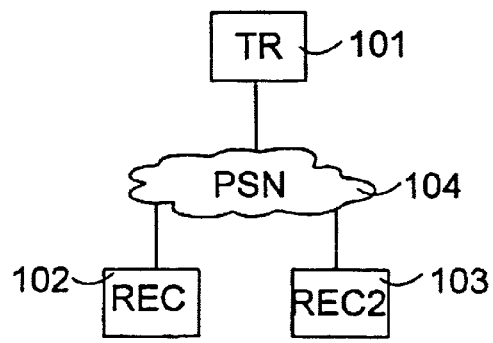
FIG. 1 is a block diagram showing a telecommunications system according to a preferred embodiment of the invention.

FIG. 1 shows a telecommunications system according to a preferred embodiment of the invention where synchronization is needed between network elements over a packet-switched network. A transmitter network element (TR) 101 comprises a highly accurate clock or has access to a highly accurate clock such as an atomic clock or GPS (Global Positioning System). The transmitter 101 sends time stamps to one or more receiver network element (REC, REC2) 102, 103 over a packet-switched network (PSN) 104, such as an IP network, with variable delay. The transmitter 101 may be any kind of network element providing reference timing information to enable receivers 102, 103 to synchronize their frequencies. The receiver 102, 103 may be any kind of network element using the time stamps advantageously in order to achieve the same timing for frequency generation as the transmitter 101, that is, to achieve frequency synchronization with the transmitter 101.

The synchronization is achieved based on estimating the frequency of an oscillator of the receiver 102, 103. For instance, if the system comprises a mobile network, the transmitter 101 may be a base station controller transmitting time stamps to base stations 102, 103 over a packet-switched network and the base stations 102, 103 may then build their own reference frequencies based on the time stamps.

Figure 2:
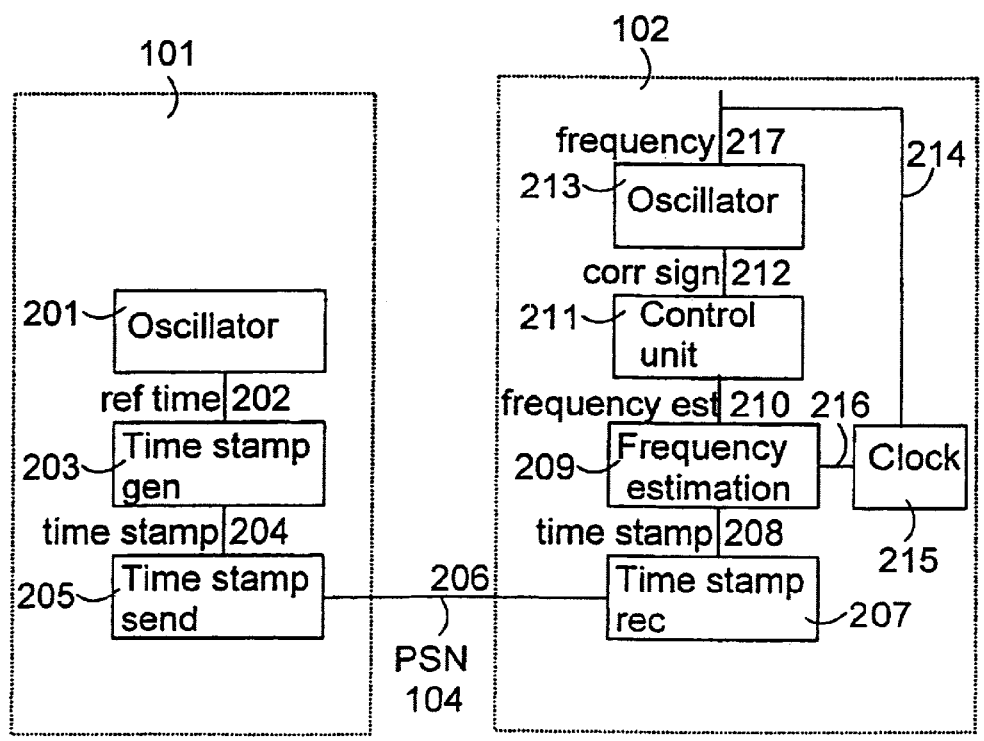
FIG. 2 is a block diagram illustrating a transmitter and a receiver according to a preferred embodiment of the invention.

FIG. 2 illustrates elements of the transmitter 101 (the transmitter of the time stamps) and the receiver 102 (the receiver of the time stamps) relevant to the invention. The transmitter 101 comprises a reference oscillator 201 and the receiver 102 comprises a receiver oscillator to be adjusted 213. The reference oscillator 201 produces reference timing information 202. The frequency of the reference oscillator 201 (reference frequency $f_{ref}$) is considered to be substantively constant as the transmitter 101 comprises or has access to a highly accurate clock and the receiver 102 is aware of the reference frequency. The reference frequency is advantageously stored in the memory of the receiver 102 (or it may be queried from the transmitter 101). The transmitter 101 further comprises means 203 to generate time stamps 204 based on the reliable reference timing information 202 and means 205 to transmit the time stamps 206 through a packet-switched network 104 to the receiver 102. The time stamps 204 may be generated and transmitted at constant or variable time intervals (measured by the transmitter 101) and they are preferably sent automatically without any specific request. If the time interval between consecutive time stamps is variable, the time stamps 206 comprise information on the transmit time measured by the transmitter 101.

The receiver 102 comprises means 207 to receive time stamps 206 from the transmitter 101 and means 209 to estimate the expected times for reception of time stamps 208 and the frequency 217 of the receiver oscillator 213. The estimation procedures according to a preferred embodiment of the invention will be described in more detail later. A local clock 215 driven 214 by the oscillator 213 is used to measure reception times of time stamps 216. A control unit 211 obtains the information of the estimated frequency 210 and is used for controlling the oscillator 213 by a correction signal 212. A feedback signal from the oscillator 213 may be directly coupled to the control unit 211 (not shown). The receiver oscillator 213 is then adjusted to produce the output frequency 217 based on the correction signal 212.

If the frequency of the receiver oscillator 213 is f, the goal is to achieve an estimation of f, $\hat{f}$, minimizing the influence of the time deviation due to delays in the transmitter 101, the packet-switched network 104, and the receiver 102. It is assumed that the maximum time between the first and the last time stamp that can be used in the algorithm is $T_W$ and that the required accuracy is $$a = \left|\frac{f - \hat{f}}{f}\right|.$$

Figure 3:
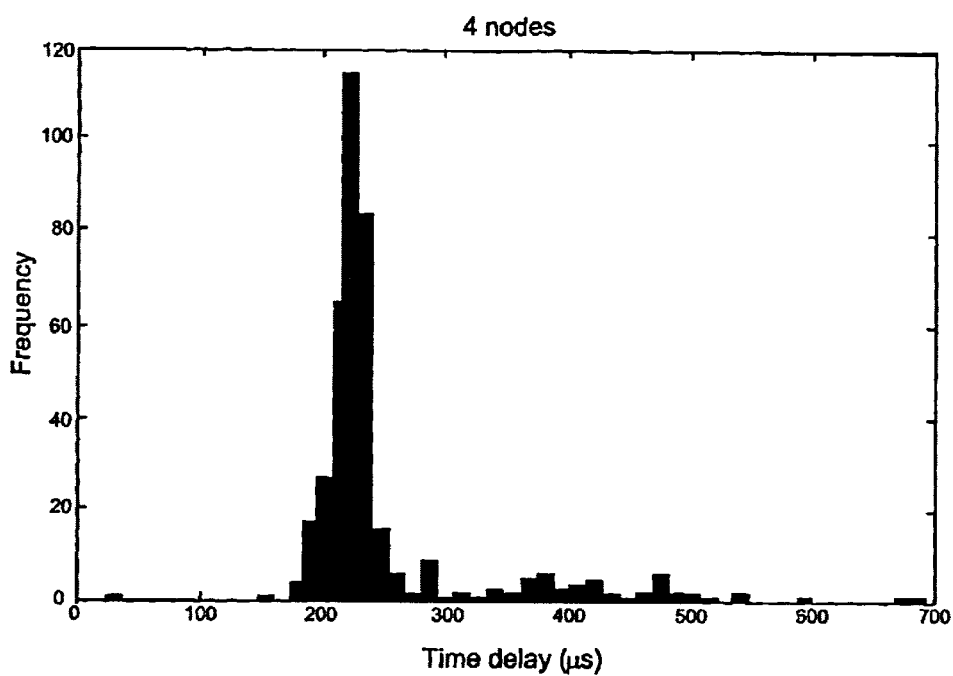
FIG. 3 is a histogram showing measurement results for simulated data traffic in a local area network.

The starting point is the equation
$X(n) = x(n) + t(n) \times f/f_{ref}$, where $X(n)$ is the time for reception of time stamp n, $x(n)$ is the delay of the same time stamp, $f_{ref}$ is the reference frequency of the reference oscillator 201 and $t(n)$ is the transmit time of time stamp n. It is possible that the time stamps are delivered with constant time intervals, when $t(n)$ could be replaced by $\Delta t \times n$, where $\Delta t$ is predefined. If time stamps are delivered with variable time intervals, the time stamps need to comprise information on the transmit time $t(n)$. If $x(n)$ were independent of n, then $X(n)$ would be linear in $t(n)$ with the linear coefficient $f/f_{ref}$. However, $x(n)$ varies a lot in a typical packet-switched telecommunications system. In FIG. 3 the measured distribution of $x(n)$ is shown for a LAN where the data traffic has been simulated by letting four workstations send 100 byte packages every 5 ms. In a system considered $\Delta T_W = 30 \mu s$. As appears from FIG. 3 that the standard deviation of $x(n)$ is much larger than that.

As a reference method the following simple estimation of $f$ is shown:

$$\hat{f} = \frac{X(n_0 + n_w - 1) - X(n_0)}{t(n_0 + n_w - 1) - t(n_0)} \times f_{ref},$$

where $n_{w-1}$ is in this reference method the last time stamp that can be used and is such that $X(n_0 + n_w - 1) - X(n_0) < T_w$. This method uses only two values from the time series $\{X(n)\}$. In order to achieve an accuracy of $\Delta$, the error in the time difference between two time stamps must be smaller than $\Delta T_W$. The drawback of the reference method is that it is very sensible to the wide variation in delay $x(n)$ that is typical of a packet-switched network.

Figure 4:
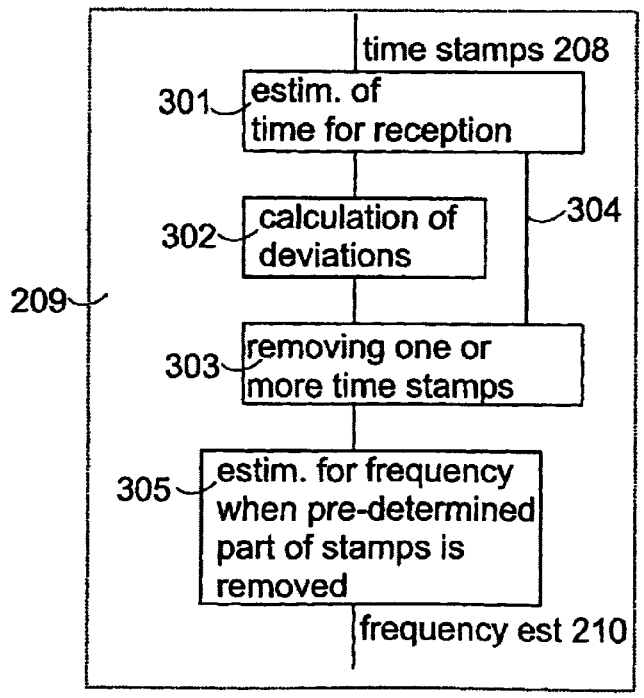
FIG. 4 is a block diagram illustrating an estimator for estimating frequency f.

In the following an estimation of the frequency f according to a preferred embodiment of the invention will be described with reference to FIG. 4. In the following embodiment the frequency f is estimated by least-squares method, however, it is also possible to use some other method, for instance weighting of time stamps.

The receiver 102 comprises the estimator 209 to estimate the frequency f using advantageously a pre-defined window of time stamps, wherein the number of time stamps in the window is $n_w$, that is, $n_w$, received time stamps will be used when f is estimated. The number of time stamps $n_w$ in the window is advantageously experimentally adjusted to an optimal value, it is also possible that the window covers all received time stamps. If the time interval between consecutive time stamps in the transmitter 101 is variable, the estimator 209 comprises means to check the transmit time $t(n)$ from time stamps 208 and estimate the frequency f taking also the transmit time $t(n)$ into account.

A conventional least-squares algorithm may be used to estimate the frequency f and the expected times for the reception of the time stamps preferably taking into account all time stamps $n_w$ in the window (at first iteration). Thus the estimator 209 comprises means 301 to estimate at least the expected times for reception $X(n)$ of the time stamps utilizing least-squares estimation, first covering all time stamps $n_w$ in the window. By taking all time stamps $n_w$ into account the influence of variation in $x(n)$ is reduced.

The least-squares algorithm is optimum if the sequence of the delay $x(n)$ is uncorrelated and Gaussian. However, $x(n)$ is not Gaussian, but its probability distribution function (pdf) is asymmetric with a more pronounced tail. It is possible to get the delay $x(n)$ more Gaussian-like by removing $N_r$ time stamps that deviate most from the other time stamps. The number of time stamps to be removed, $N_r$ may be decided each time the synchronization is done. Preferably $N_r$ is pre-determined, for example based on measured statistics of the network 104, accuracy demands or oscillator stability.

The estimator 209 further comprises means 302 to calculate deviations of measured reception times from the estimated expected times and means 303 to remove one or more time stamps deviating most from the expected times.

A repeat loop 304 from 303 to 301 is used if the $N_r$ number of samples have not been removed. The time stamps may be advantageously removed one by one by iteration so that estimations, deviation calculations and time stamp removals 301–303 are repeated by using the repeat loop 304 for the remaining time stamps. As the $N_r$ number of time stamps with greatest deviations are removed, the estimator 209 comprises means 305 to estimate the frequency f using the remaining time stamps. The frequency information 210 based on the estimated frequency, $\hat{f}$, may then be used for adjusting frequency generation so that frequency generation of the receiver oscillator 213 may be synchronized.

In the following the preferred embodiment of the invention is illustrated mathematically, where the estimated frequency, $\hat{f}$, is calculated by iteration.

1. The vector $$\overline{X}_0 = \begin{pmatrix} X(n_0) \\ X(n_0+1) \\ \vdots \\ X(n_0+n_w-1) \end{pmatrix}$$

is formed, $\overline{X}_0$ is a $n_w \times 1$ vector.

2. The $n_w \times 2$ matrix $$A_0 = \begin{pmatrix} 1 & t(n_0) \\ 1 & t(n_0+1) \\ \vdots & \vdots \\ 1 & t(n_0+n_w-1) \end{pmatrix}$$

is formed.

3. A linear regression estimating the frequency f and the expected times for reception, $\hat{X}_0(n) = \hat{C}_0 + t(n) \times \hat{f}_0/f_{ref}$, may be calculated by applying a conventional least-squares algorithm, taking all time stamps in the window into account. $\hat{X}_0(n)$ is the least-squares estimate for $X(n)$, $\hat{C}_0$ and $\hat{f}_0/f_{ref}$ are scalars given by the matrix equation $$\begin{pmatrix} \hat{C}_0 \\ \hat{f}_0/f_{ref} \end{pmatrix} = (A_0^T A_0)^{-1} A_0^T \overline{X}_0 \cdot C$$

and f may be substantially simultaneously estimated, then the estimated $\hat{C}$ and $\hat{f}$ (at first iteration $\hat{C}_0$ and $\hat{f}_0$) may be used to calculate the estimate for expected times of reception $\hat{X}(n)$.

4. Deviation from the estimate $\hat{X}_0(n)$, $e_n = |X(n) - \hat{X}_0(n)|$, is calculated for time stamps from $n_0$ to $n_0 + n_w - 1$.

5. It is supposed that the time stamp m deviates most from its estimated expected time, thus $m = \max \arg e_n$, that is, $e_m \geq e_n$ for all n.

6. A new vector $\overline{X}_1 =$ $$\overline{X}_1 = \begin{pmatrix} X(n_0) \\ X(n_0+1) \\ \vdots \\ X(m-1) \\ X(m+1) \\ \vdots \\ X(n_0+n_w-1) \end{pmatrix}$$

is formed, which is identical to $\overline{X}_0$ except that $X(m)$ has been removed. $\overline{X}_1$ is thus a $(n_w-1) \times 1$ vector.

7. A new $(n_w-1) \times 2$ matrix $A_1 =$ $$A_1 = \begin{pmatrix} 1 & t(n_0) \\ 1 & t(n_0+1) \\ \vdots & \vdots \\ 1 & t(m-1) \\ 1 & t(m+1) \\ \vdots & \vdots \\ 1 & t(n_0+n_w-1) \end{pmatrix}$$

is formed.

8. A new estimate $\hat{X}_1(n) = \hat{C}_1 + t(n) \times \hat{f}_1/f_{ref}$ is made, where $\hat{C}_1$ and $\hat{f}_1/f_{ref}$ are scalars given by the matrix equation $$\begin{pmatrix} \hat{C}_1 \\ \hat{f}_1/f_{ref} \end{pmatrix} = (A_1^T A_1)^{-1} A_1^T \overline{X}_1.$$

9. Step 4 is returned and the steps 4 to 8 are repeated $N_r$ times (the first time included). In every iteration advantageously one time stamp is removed from the equation. As $N_r$ number of time stamps have been removed, the last equation is thus $$\begin{pmatrix} \hat{C}_{N_r} \\ \hat{f}_{N_r}/f_{ref} \end{pmatrix} = (A_{N_r}^T A_{N_r})^{-1} A_{N_r}^T \overline{X}_{N_r},$$

where $\hat{X}_{N_r}$ is a $(n_w - N_r) \times 1$ vector. The final estimation for f is then $\hat{f} = \hat{f}_{N_r}$ (the frequency estimate information 210 in FIG. 4) which may then be used for adjusting frequency generation of the oscillator 213. As indicated earlier (the means 301), the frequency f is advantageously estimated only in the final iteration (step 9).

According to an embodiment of the invention, it is also possible to remove the pre-determined number $N_r$ of time stamps at once and derive the estimated frequency, $\hat{f}$, without using iteration. This means that the repeat loop 304 is not needed and f may be estimated after the first removal of time stamps.

Referring again to FIG. 2, the receiver 102 comprises means 211 (control unit) to generate a correction signal 212 for the oscillator 213 based on the information of the estimated frequency $\hat{f}$ 210. It is further possible to have feedback from oscillator output 217 to the control unit 211 (not shown).

The correction signal 212 advantageously determines the required adjustment needed in the oscillator 213. The correction signal 212 may then be sent to the oscillator 213, and the frequency 217 generation in the oscillator 213 is adjusted based on the correction signal 212 (using the frequency information 210). The local clock 215 of the receiver 102 is then also adjusted when the frequency 217 of the oscillator is changed, that is, the running of the clock is changed based on the estimated frequency.

The accurate estimation of f allows the synchronization of the frequencies produced by the oscillators 201 and 213. The oscillator 213 may generate frequencies 217 for various needs in a network element, e.g. for different functions in a transceiver or in a switch.

The need for synchronization depends very much on system characteristics, for instance on the used oscillators and network load. Advantageously the synchronization procedures described above are done every time when a time stamp is received, it is also possible to do the procedures at certain time intervals using the clock 215 of the receiver 102.

Figure 5:
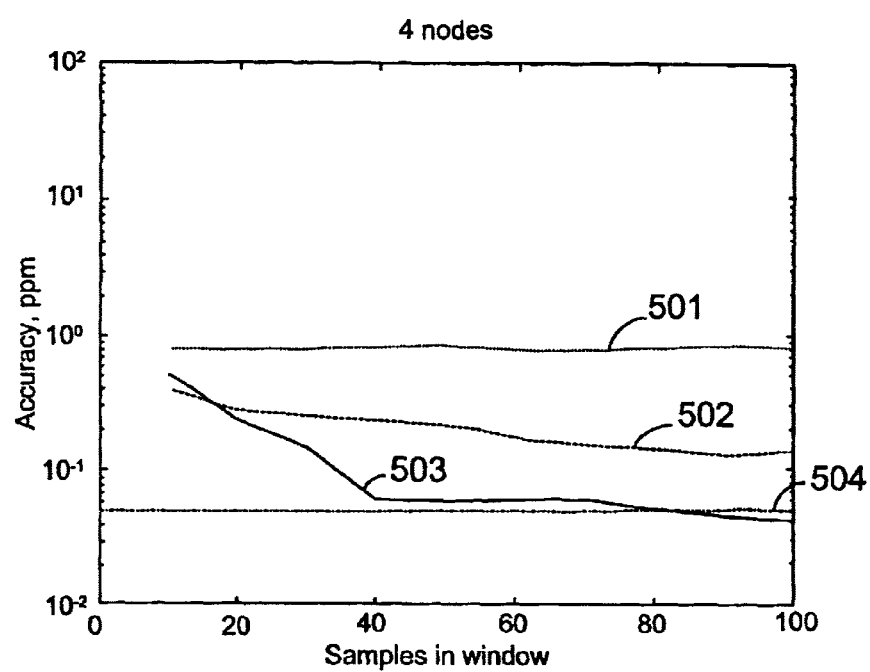
FIG. 5 illustrates simulation results for a local area network.

In FIG. 5 simulation results are shown based on measurements of a similar system as in FIG. 3. 20% of the time stamps have been removed ($N_r = 0.2 n_w$). The number of time stamps in the window, $n_w$, has been varied from 10 to 100. Increasing the number of time stamps $n_w$ within the window enhances the performance. The dotted line 501 refers to the reference method using the first and the last time stamps in the window only. The dashed line 502 shows the result of the plain least-squares method ($\hat{f} = \hat{f}_0$). The solid line 503 is the modified least-squares method according to the preferred embodiment of the invention. Finally the line of dots and dashes 504 indicates the required accuracy in the system.

As the simulation results show, the synchronization according to the preferred embodiment of the invention enables more accurate estimation of the frequency. This allows more accurate frequency synchronization of the receiver oscillator 213 based on the reference oscillator 201.

The present invention can be implemented to the existing network elements. They all have processors and memory with which the inventive functionality described above may be implemented. Parts of the transmitter 101 and receiver 102 according to the preferred embodiment of the invention may be implemented by means of software run in a processor. Also, it is possible to implement some functions as a hardware solution, for example by applying Application Specific Integrated Circuit (asic) or separate logic.

The present invention may be used also in mobile packetswitched networks. For instance, the invention may be used in a General Packet Radio Service (GPRS) network to provide frequency synchronization for base station.

It is obvious to one skilled in the art that as technology advances, the inventive concept can be implemented in many different ways. Hence the invention and its embodiments are not limited to the above examples, but may vary within the scope and spirit of the appended claims.

What is claimed is:

1. A method for providing frequency synchronization in a telecommunications system, the method comprising the steps of:
   creating time stamps in a transmitter network element to provide timing information based on a reference oscillator of the transmitter network element,
   transferring time stamps over a packet-switched network from the transmitter network element to a receiver network element, the receiver network element having a receiver oscillator,
   (i) estimating expected times for reception of time stamps in the receiver network element,
   (ii) calculating deviations from the estimated expected times for time stamps,
   (iii) removing at least one time stamp deviating most from the estimated expected time,
   repeating the above mentioned steps (i)–(iii) by removing at least one time stamp at a time until a pre-determined part of the time stamps is removed,
   estimating frequency of the receiver oscillator using the remaining time stamps after the pre-determined part of the time stamps is removed, and
   adjusting the frequency generation of the receiver oscillator based on said estimated frequency.

2. A method according to claim 1, wherein said frequency and the expected times for reception are estimated by least-squares method.

3. A method according to claim 1 or 2, wherein the pre-determined part of the time stamps is removed at once after the deviations have been calculated for the first time.

4. A method according to claim 1, further comprising the step of:
   generating a correction signal based on said estimated frequency in a control unit of the receiver network element, and adjusting the frequency generation of the receiver oscillator based on the correction signal.

5. A method according to claim 1, further comprising the steps of:
   storing frequency of the reference oscillator in the receiver network element, and
   using the stored frequency when estimating the frequency of the receiver oscillator.

6. A method according to claim 1, wherein a time interval between consecutive time stamps in the transmitter network element is constant.

7. A method according to claim 1, wherein a time interval between consecutive time stamps in the transmitter network element is variable and a transmit time measured by the transmitter network element is given in time stamps.

8. An apparatus in a telecommunications system, said apparatus comprising:
   a receiver oscillator,
   means to receive time stamps providing time information,
   means to estimate expected times for reception of time stamps,
   means to calculate deviations from the estimated expected times for received time stamps,
   means to remove at least one of the received time stamps deviating most from the estimated expected time,
   means to estimate frequency of the receiver oscillator when a predetermined part of the time stamps is removed, and
   means to adjust the frequency generation of the receiver oscillator based on said estimated frequency.

9. An apparatus according to claim 8, wherein the expected times for reception of the time stamps and said frequency are estimated by a least-squares method.

10. An apparatus according to claim 8 or 9, wherein said apparatus further comprises means to generate a correction signal based on said estimated frequency, and
   means to adjust the frequency generation of the receiver oscillator based on the correction signal.

11. An apparatus according to claim 8, wherein time stamps are removed one time stamp at a time repeating the estimations of the expected times and the deviation calculations until the pre-determined part of the time stamps has been removed.

12. An apparatus according to claim 8, wherein said apparatus further comprises a local clock driven by the receiver oscillator used for measuring the reception times of time stamps.

13. An apparatus according to claim 8, wherein said apparatus is a base station of a mobile telecommunications system.

14. A telecommunications system comprising a transmitter network element and a receiver network element having a receiver oscillator,
   wherein the transmitter network element is configured to create time stamps to provide timing information based on a reference oscillator of the transmitter network element and configured to transfer time stamps over a packet-switched network to the receiver network element,
   wherein the receiver network element is configured to:
   (i) estimate expected times for reception of time stamps in the receiver network element, (ii) calculate deviations from the estimated expected times for time stamps, (iii) remove at least one time stamp deviating most from the estimated expected time, repeat the above mentioned steps (i)–(iii) by removing at least one time stamp at a time until a pre-determined part of the time stamps is removed, estimate frequency of the receiver oscillator using the remaining time stamps after the pre-determined part of the time stamps is removed, and adjust the frequency generation of the receiver oscillator based on said estimated frequency.

\* \* \* \* \*

UNITED STATES PATENT AND TRADEMARK OFFICE
CERTIFICATE OF CORRECTION

PATENT NO.    : 6,658,025 B2
DATED         : December 2, 2003
INVENTOR(S)   : Mauritz et al.

It is certified that error appears in the above-identified patent and that said Letters Patent is hereby corrected as shown below:

Column 1,
Line 26, "ele-ment" should read -- element --
Line 36, "syn-chronize" should read -- synchronize --
Line 46, "net-works" should read -- networks --
Line 52, "syn-chronization" should read -- synchronization --

Column 3,
Line 63, "$X(n)=x(n)+t(n)x/f_{ref}$" should read -- $X(n)=x(n)+t(n)xf/f_{ref}$ --

Column 5,

Line 48, "$\otimes(n)$" should read -- $\hat{X}(n)$ --

Signed and Sealed this

First Day of June, 2004

JON W. DUDAS
*Acting Director of the United States Patent and Trademark Office*